US009924210B2

(12) United States Patent
Burke

(10) Patent No.: US 9,924,210 B2
(45) Date of Patent: Mar. 20, 2018

(54) COMPUTER SYSTEM AND METHOD FOR TARGETING CONTENT TO USERS VIA MULTIPLE TECHNOLOGY PLATFORMS

(71) Applicants: clypd, inc., Somerville, MA (US); SpotXchange, Inc., Westminster, CO (US)

(72) Inventor: Jason M. Burke, Chestnut Hill, MA (US)

(73) Assignees: clypd, inc., Somerville, MA (US); SpotXchange, Inc., Westminster, CO (US)

( * ) Notice: Subject to any disclaimer, the term of this patent is extended or adjusted under 35 U.S.C. 154(b) by 0 days.

(21) Appl. No.: 15/213,354

(22) Filed: Jul. 18, 2016

(65) Prior Publication Data

US 2017/0026675 A1    Jan. 26, 2017

Related U.S. Application Data

(60) Provisional application No. 62/196,435, filed on Jul. 24, 2015.

(51) Int. Cl.
| | |
|---|---|
| *H04N 21/2668* | (2011.01) |
| *H04N 21/24* | (2011.01) |
| *H04N 21/81* | (2011.01) |
| *H04N 21/25* | (2011.01) |
| *H04N 21/442* | (2011.01) |
| *H04N 21/478* | (2011.01) |
| *H04W 4/14* | (2009.01) |
| *H04L 12/58* | (2006.01) |

(52) U.S. Cl.
CPC ....... *H04N 21/2407* (2013.01); *H04N 21/251* (2013.01); *H04N 21/2668* (2013.01); *H04N 21/44222* (2013.01); *H04N 21/478* (2013.01); *H04N 21/812* (2013.01); *H04L 51/22* (2013.01); *H04W 4/14* (2013.01)

(58) Field of Classification Search
CPC .................................................. H04N 21/2668
USPC ................................................ 725/9, 32, 35
See application file for complete search history.

(56) References Cited

U.S. PATENT DOCUMENTS

| | | | |
|---|---|---|---|
| 5,948,061 | A | 9/1999 | Merriman |
| 6,708,335 | B1 | 3/2004 | Ozer |
| 6,876,974 | B1 | 4/2005 | Marsh |
| 7,089,195 | B2 | 8/2006 | Rosenberg |
| 7,853,474 | B2 | 12/2010 | Ullah |

(Continued)

FOREIGN PATENT DOCUMENTS

| | | |
|---|---|---|
| WO | 2010058896 | 5/2010 |
| WO | 2010125579 A1 | 11/2010 |
| WO | 2012151026 | 11/2012 |

*Primary Examiner* — Dominic D Saltarelli
(74) *Attorney, Agent, or Firm* — Blueshift IP, LLC; Robert Plotkin

(57) ABSTRACT

A computer system uses data about delivery of particular content to users via multiple technology platforms. For example, the computer system may track delivery of particular content to an audience via television in order to enable the same or similar content to be delivered to the same or similar audience via a digital medium (e.g., the web), and vice versa. The computer enables the provider of the content (e.g., advertisement) to benefit from exposure data in one medium or technology platform—namely television or digital—when targeting content at viewers in the other medium or technology platform.

24 Claims, 5 Drawing Sheets

(56) References Cited

U.S. PATENT DOCUMENTS

| | | |
|---|---|---|
| 7,861,260 B2 | 12/2010 | Shkedi |
| 8,051,444 B2 | 11/2011 | Shkedi |
| 8,302,120 B2 | 10/2012 | Ramaswamy |
| 8,566,164 B2 | 10/2013 | Shkedi |
| 8,676,651 B2 * | 3/2014 | Lerman ................. G06Q 30/00 705/14.4 |
| 8,887,188 B2 | 11/2014 | Hadfield |
| 8,997,138 B2 | 3/2015 | Shkedi |
| 9,078,035 B2 | 7/2015 | Shkedi |
| 9,083,853 B2 | 7/2015 | Shkedi |
| 2004/0133909 A1 * | 7/2004 | Ma .................... G06Q 30/0207 725/34 |
| 2004/0172324 A1 | 9/2004 | Merriman |
| 2012/0240144 A1 | 9/2012 | Rose |
| 2012/0240151 A1 | 9/2012 | Tapper |
| 2012/0303442 A1 | 11/2012 | Patwa |
| 2013/0013396 A1 | 1/2013 | Vinson |
| 2013/0104159 A1 | 4/2013 | John |
| 2014/0046775 A1 | 2/2014 | Harb |
| 2015/0058113 A1 | 2/2015 | Yi |

* cited by examiner

US 9,924,210 B2

COMPUTER SYSTEM AND METHOD FOR TARGETING CONTENT TO USERS VIA MULTIPLE TECHNOLOGY PLATFORMS

BACKGROUND

Companies often provide content to users via multiple technology platforms, such as via television and digital media. For example, advertisers often run advertising campaigns via both television and digital media (e.g., the World Wide Web). For example, an advertiser might run a particular advertising campaign via both television and web-based advertising. Currently, however, advertisers cannot easily track and target the viewers who have been exposed to a particular advertisement or advertisement campaign across both television and digital media. Instead, advertisers must gather such advertisement exposure data separately for both television and digital media, and then combine and analyze such data as needed to draw conclusions about the viewers who have been exposed to an advertisement campaign across both television and digital media.

SUMMARY

A computer system uses data about delivery of particular content to users via multiple technology platforms. As one example, the computer system may track delivery of particular television advertisements to an audience via television in order to enable the same or similar advertisements to be delivered to the same or similar audience via a digital medium (e.g., the World Wide Web), and vice versa. The computer enables the provider of the content (e.g., advertisement) to benefit from exposure data in one medium or technology platform—namely television or digital—when targeting content (e.g., advertisements) at viewers in the other medium or technology platform.

Other features and advantages of various aspects and embodiments of the present invention will become apparent from the following description and from the claims.

DETAILED DESCRIPTION

Embodiments of the present invention include computer-implemented techniques for automatically identifying the users to whom certain content has been delivered via one of a plurality of technology platforms, e.g., television and digital media (e.g., the World Wide Web ("web")). Once such identification has been performed, embodiments of the present invention may use such user identification data to select content for delivery to the same and/or similar viewers via one or both of the technology platforms (e.g., television and/or digital media), based on the identification of the users to whom the previous content was delivered. As a particular example, embodiments of the present invention may automatically identify the users to whom certain content has been delivered via a first one of the plurality of technology platforms (e.g., television), and then select content for delivery to the same and/or similar users via a second one of the plurality of technology platforms (e.g., digital media), based on the identification of users.

For example, certain embodiments of the present invention include computer-implemented techniques for automatically identifying the users who have been exposed to an advertisement campaign across one or both of television and digital media. Once such identification has been performed, embodiments of the present invention may use such viewer identification data to make advertisement placement decisions for television and/or digital media based on the viewer identification data. Embodiments of the present invention may deliver advertisements to users in accordance with such advertisement placement decisions.

Figure 1:
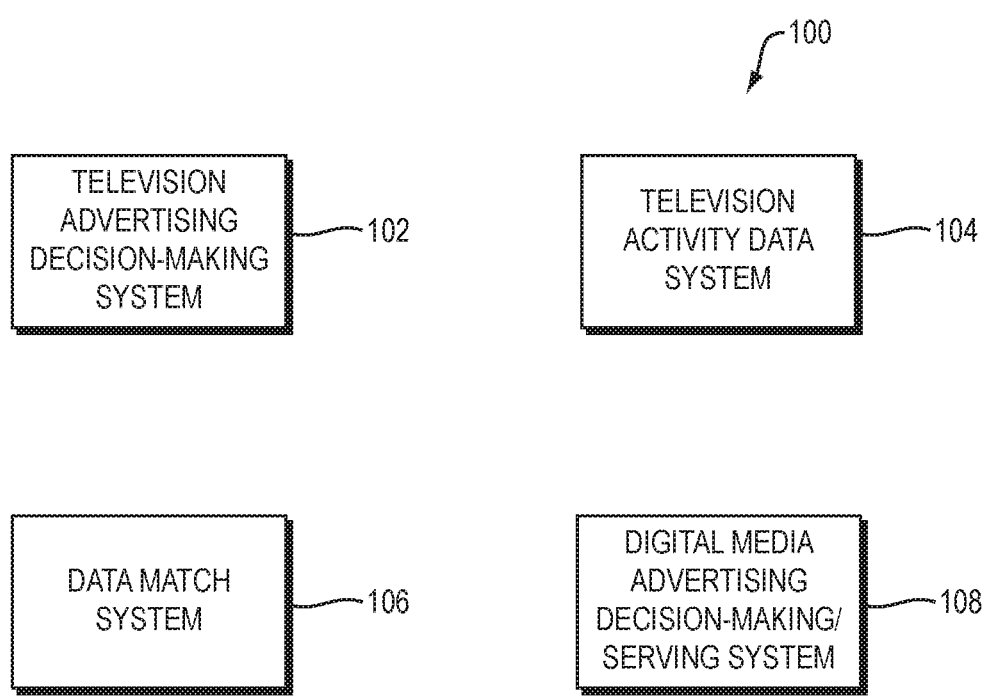
FIG. 1 is a diagram of a system implemented according to one embodiment of the present invention.

For example, FIG. 1 shows a system 100 according to one embodiment of the present invention. The system 100 includes five separate component subsystems, namely:

a television advertising decision-making system 102;
a television activity data system 104;
a data match system 106; and
a digital media advertising decision-making/serving system 108.

Figure 2:
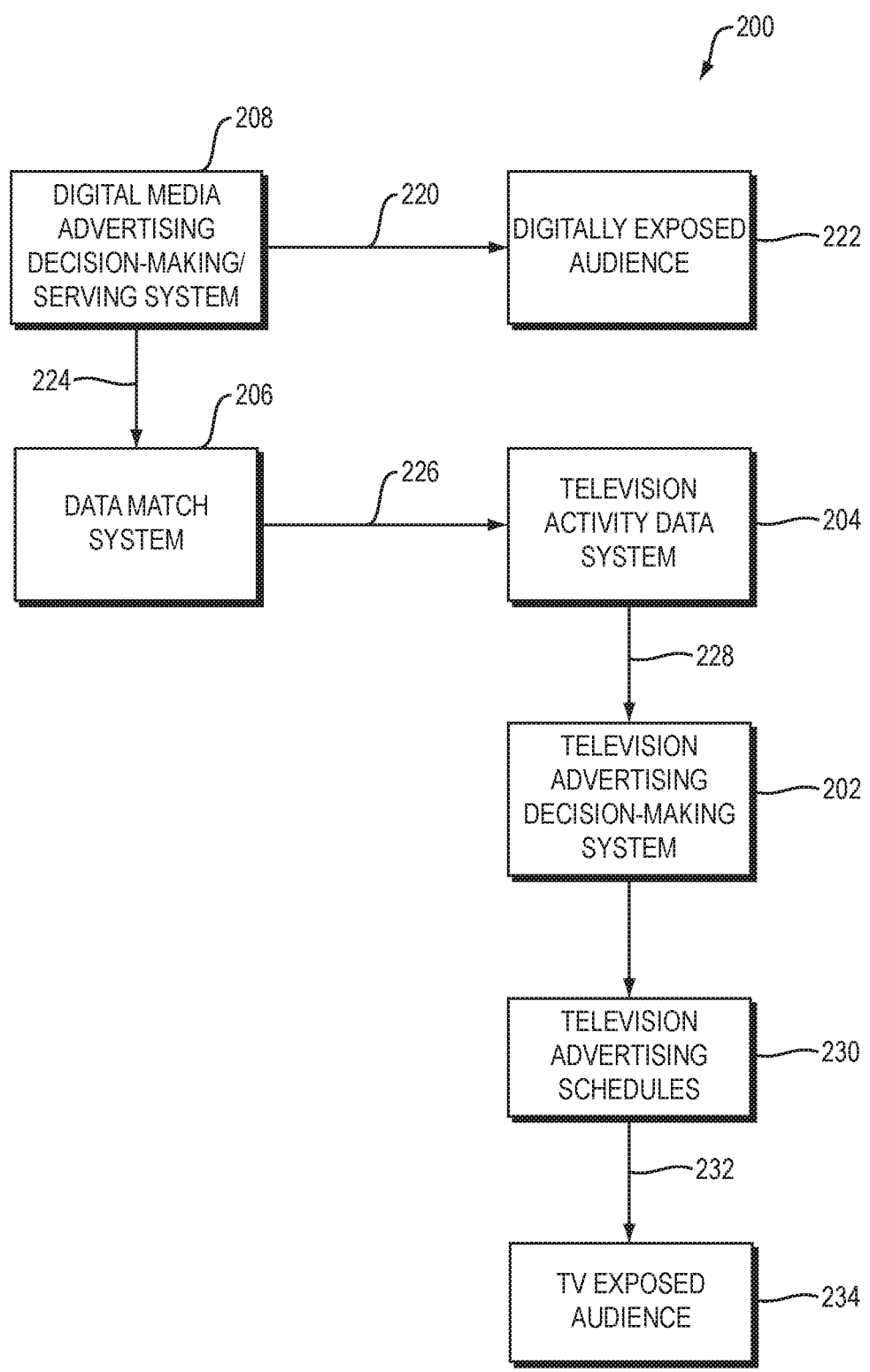
FIG. 2 is a dataflow diagram of one embodiment of the system of FIG. 1.
Figure 4:
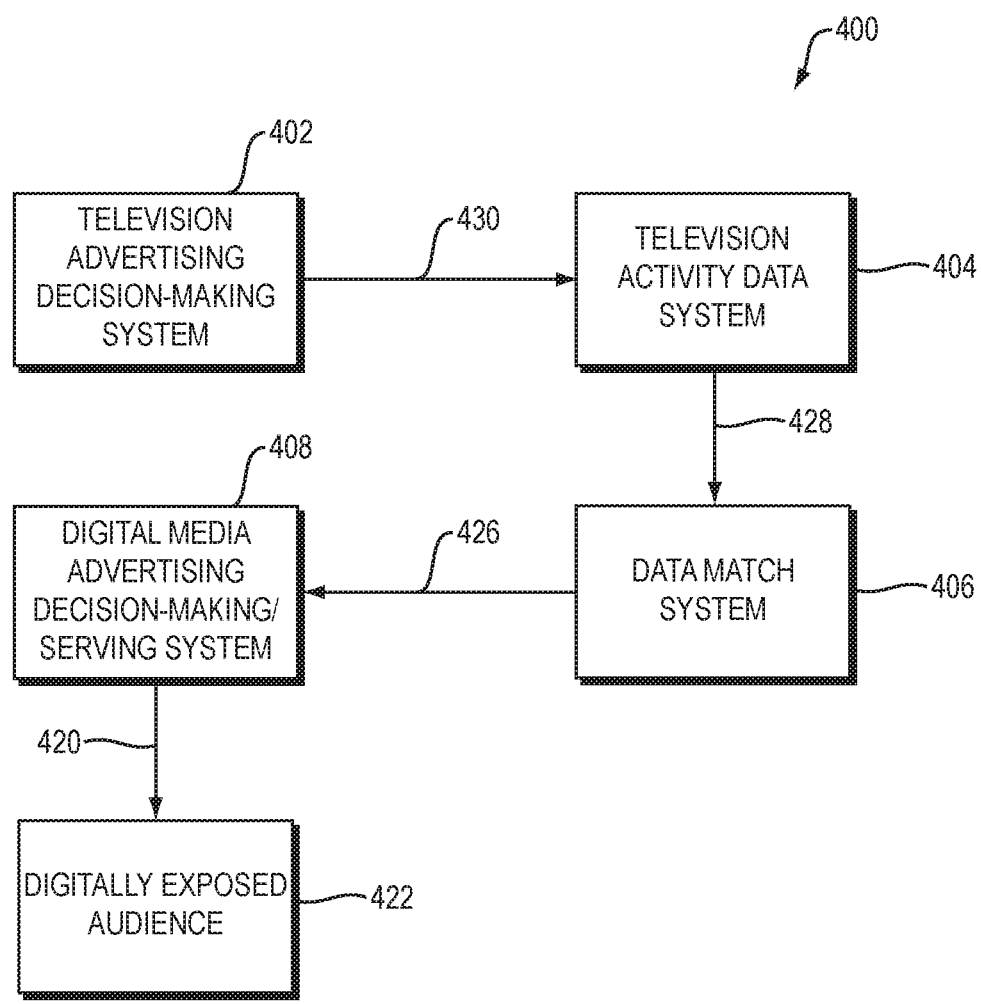
FIG. 4 is a dataflow diagram of another embodiment of the system of FIG. 1.

Although the five systems 102, 104, 106, and 108 are shown in FIG. 1 as disconnected systems, in particular embodiments of the present invention the systems 102, 104, 106, and 108 may communicate with each other in various ways. In particular, two embodiments of the system 100 are shown in FIGS. 2 and 4, respectively, which will now be described. Other embodiments of the system 100 will be apparent to those having ordinary skill in the art.

Some or all of the systems 102, 104, 106, and 108 may be computer-implemented. For example, any one or more of the systems 102, 104, 106, and 108 may include one or more of the following: a computing device (containing, e.g., a processor and a non-transitory computer-readable medium) and computer program instructions stored on a non-transitory computer-readable medium. Some or all of the systems 102, 104, 106, and 108 may be implemented solely as machines (which may, for example, include computer hardware and/or software), and thereby not include humans. Some or all of the systems 102, 104, 106, and 108 may perform some or all of the functions disclosed herein automatically, i.e., without human intervention.

The system 100 as a whole may, for example, enable television advertisements to be targeted and delivered to users via television based on digital inventory ad exposure (as shown in FIG. 2) and to enable digital advertisements to be targeted and delivered to users via a digital medium based on television inventory ad exposure (as shown in FIG. 4).

The term "technology platform," as used herein, includes both television and digital media. In other words, television is an example of a "technology platform," as that term is used herein, and a digital medium (e.g., the web) is an example of a "technology platform," as that term is used herein. Examples of digital media include the web, text messages, email messages, and mobile applications. For example, delivering an advertisement to a user via a web page is an example of delivering the advertisement to the user via a "digital medium" and via a "technology platform," namely the digital medium and technology platform of the web. Similarly, delivering an advertisement to a user via a text message is an example of delivering the advertisement to the user via a "digital medium" and via a "technology platform," namely the digital medium and technology platform of text messaging.

Figure 3:
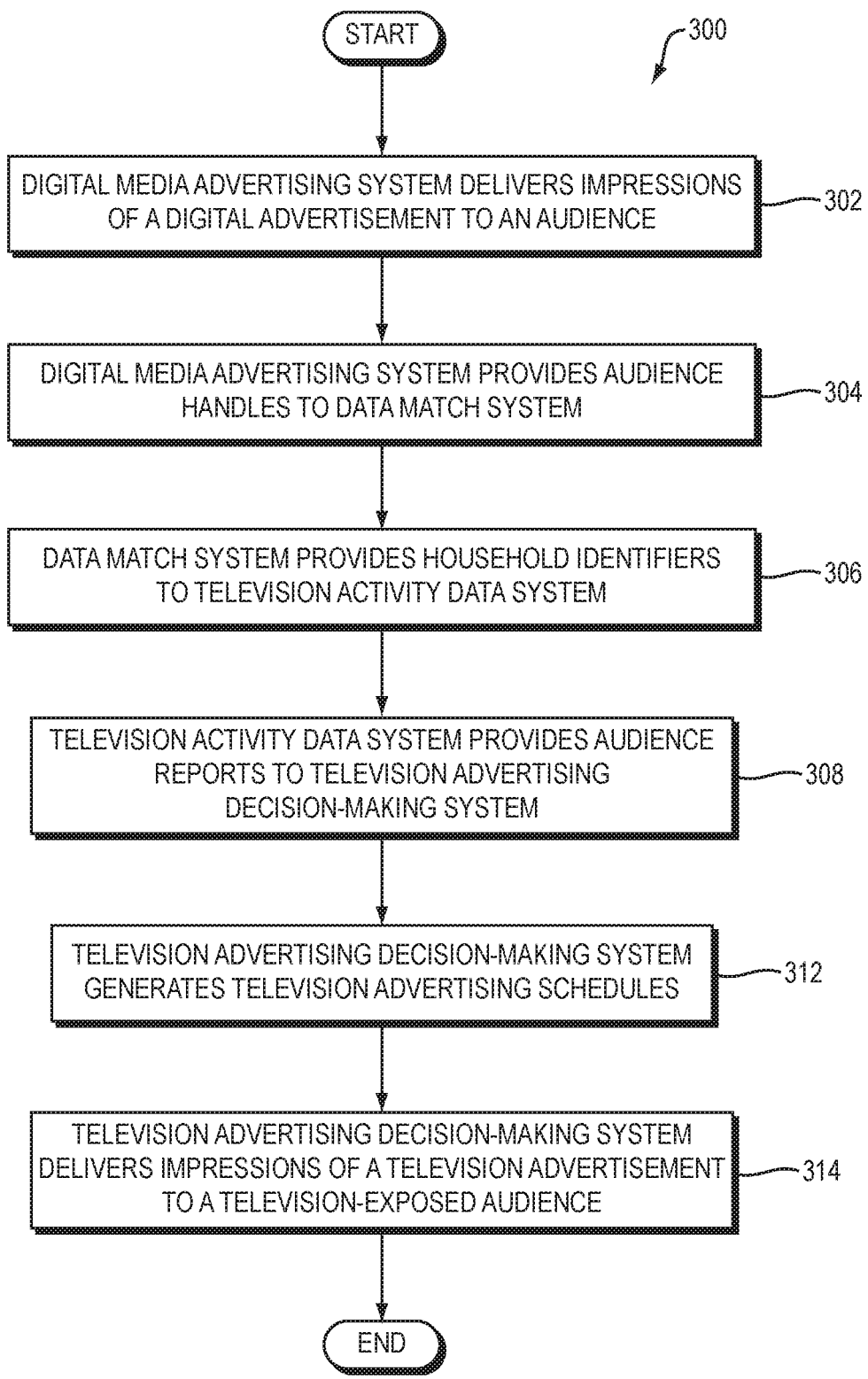
FIG. 3 is a flowchart of a method performed by one embodiment of the system of FIG. 2.

Referring to FIG. 2, a system 200 implemented according to one embodiment of the present invention is shown. The system 200 is one embodiment of the system 100 of FIG. 1. Referring to FIG. 3, a flowchart is shown of a method 300 performed by the system 200 of FIG. 2 according to one embodiment of the present invention.

The system 200 of FIG. 2 includes a digital media advertising decision-making/serving system 208, which is an embodiment of the digital media advertising decision-making/serving system 108 of FIG. 1. As described above, the system 208 may be computer-implemented (e.g., as a computing device and/or computer software), and may perform some or all of the functions disclosed herein automatically, i.e., without human intervention.

In the system 200 of FIG. 2, the digital media advertising system 208 delivers impressions 220 of a digital advertisement to one or more users 222 (FIG. 3, operation 302). The term "digital advertisement," as used herein, refers to any advertisement containing digital content which is delivered to an end user via a digital medium, such as via the web, text messaging, email messaging, or a mobile application. A digital advertisement may, for example, be delivered to the end user using a digital application, such as a web browser or other application executing on a computer, or an app executing on a smartphone or tablet computer. A digital advertisement is not a "television advertisement." A "television advertisement," as used herein, refers to any advertisement delivered to a television screen through broadcast distribution channels (e.g., over the air or via cable). A digital advertisement may be delivered to a user using any computing device, such as a desktop computer, laptop computer, tablet computer, smartphone, billboard, electronic signage, or wearable computing device (e.g., a smart watch). A television advertisement may be delivered to a user using any of a variety of devices, such as a television, cable box, or other set-top box.

As shown in FIG. 2, the users 222 to whom the impressions 220 of the digital advertisement are delivered are referred to herein as the "digitally exposed audience." A digitally exposed audience may, therefore, include one or a plurality of users. The impressions 220 may also be referred to herein as "exposures" of the digital advertisement. As used herein, a single "exposure" or "impression" of an advertisement refers to a single output of an advertisement on a single device. As another example, if a particular advertisement is played once on a particular smartphone while a particular user watches the advertisement, and then played again later on the same smartphone while the same particular user watches the advertisement, this constitutes two exposures or impressions.

As is implied by the description above, impressions of a different advertisement may be delivered to an audience other than the digitally exposed audience 222 shown in FIG. 2. The term "digitally exposed audience," therefore, refers to the audience that is exposed digitally to impressions of a particular advertisement. Therefore, although the system 200 only shows a single digitally exposed audience 222, the system 200 may include a plurality of digitally exposed audiences, each of which is exposed to impressions of a different digital advertisement.

The digital media advertising system 208 tracks the audience 222 to whom the advertisement exposures 220 are delivered. The digital media advertising system 208 may track such exposures using any of a variety of means, such as conventional web browser cookies or tracking pixel ad server call backs.

The digital media advertising system 208 provides data 224 representing one or more identifiers (also referred to herein as "handles") 224 representing the digitally exposed audience 222 to a data match system 206, which is an embodiment of the data match system 106 of FIG. 1 (FIG. 3, operation 304). These identifiers 224 can take the form of HTTP Cookies, mobile ad IDs, and/or other values that uniquely identify the audience 222. The digital media advertising system 208 may, for example, provide the data 224 to the data match system 206 by transmitting the audience identifiers 224 digitally over a digital communication network (such as the Internet) using an IP-based communication protocol. The data match system 206 receives the audience identifiers 224 from the digital media advertising system 208. As described above, the data match system 206 may be computer-implemented (e.g., as a computing device and/or computer software), and may perform some or all of the functions disclosed herein automatically, i.e., without human intervention.

The term "audience," as used herein, refers to a person or a collection of people who are intended to be and/or have been exposed to particular content. For example, the digitally exposed audience 222 in FIG. 2 is an example of an "audience," as that term is used herein. An audience of particular content may include: (1) one or more individual persons who have been exposed to the particular content; and/or (2) one or more households who have been exposed to the particular content. A "household," as used herein, refers to an audience including one or more people, identified collectively by a household identifier. For example, a household identifier may identify a single family home located at a particular street address. An audience, therefore, may be represented by: (1) one or more person identifiers, each of which identifies a single person; and/or (2) one or more household identifiers, each of which identifies a single household. The audience identifiers 224 in FIG. 2 may, therefore, including any combination of one or more of the following: (1) one or more person identifiers identifying one or more individual people within the digitally exposed audience 222; and (2) one or more household identifiers identifying one or more households within the digitally exposed audience 222.

The data match system 206 may use any of a variety of techniques, including any of a variety of well-known techniques, to correlate the audience handle(s) 224 with one or more households, and thereby to produce household identifiers 226 representing each of those households or persons. Techniques that may be used to perform such correlation may include, for example, associating each audience handle (and/or data derived therefrom) with a particular household within a set of known audiences represented by a dataset (not shown) of households accessible to the data match system 206.

The data match system 206 may then provide those household identifiers 226 to a television activity data system 204, which is an embodiment of the television activity data system 104 of FIG. 1 (FIG. 3, operation 306). The data match system 206 may provide the data 226 to the television activity data system 204 digitally over a digital communication network (such as the Internet) using an IP-based communication protocol. The television activity data system 204 receives the data 226 from the data match system 206. As described above, the television activity data system 208 may be computer-implemented (e.g., as a computing device and/or computer software), and may perform some or all of the functions disclosed herein automatically, i.e., without human intervention.

The television activity data system 204 produces, based on the data 226, one or more reports 228 containing data representing television viewership measurements of the digitally exposed audience 222. Such reports 228 may, for example, contain measurements representing the number of times each of a plurality of households (e.g., households within the digitally exposed audience) has watched each of a plurality of television programs. In other words, the reports 228 may indicate how frequently particular households watch particular television programs. Although the term "report" is used to refer to element 226, more generally the reports 228 may be any digital data representing the information described herein in connection with the reports 228. An example of data that may be contained within such a report is shown in the table below.

TABLE 1

| Household ID | Date | Time | Network |
| --- | --- | --- | --- |
| 12345 | Feb. 1, 2016 | 10:05:50 | TNT |
| 3432 | Feb. 1, 2016 | 12:06:19 | TNT |
| 12345 | Feb. 1, 2016 | 20:44:01 | ESPN |
| 12345 | Feb. 2, 2016 | 23:00:13 | ESPN |
| 34944 | Feb. 2, 2016 | 16:57:19 | ESPN |
| 932493 | Feb. 3, 2016 | 8:19:20 | AETN |

The reports 228 may only represent households who were exposed to the digital advertisement impressions 220. The television activity data system 204 may then provide the reports 228 to a television advertising decision-making system 202, which is an embodiment of the television advertising decision-making system 102 of FIG. 1 (FIG. 3, operation 308). The television activity data system 204 may provide the data 228 to the television advertising decision-making system 202 over a digital communication network (such as the Internet) using an IP-based communication protocol. The television advertising decision-making system 202 receives the data 228 from the television activity data system 204. As described above, the television advertising decision-making system 202 may be computer-implemented (e.g., as a computing device and/or computer software), and may perform some or all of the functions disclosed herein automatically, i.e., without human intervention.

The television advertising decision-making system 202 generates one or more television advertising schedules 230 based on the data 228 (FIG. 3, operation 312). Each of the television advertising schedules 230 contains data representing the television program or television network, date, and hour into which a television advertisement is to be scheduled. The television advertising decision-making system 202 may generate the television advertising schedules 230 in any of a variety of ways. For example, consider the digital advertisement whose impressions were delivered to the digitally exposed audience 222. The television advertising decision-making system 202 may identify television inventory satisfying a particular criterion, such as television inventory with a high concentration of the digitally exposed audience 222 (e.g., one or more television programs which, according to the reports 228, were and/or are expected to be delivered to an audience containing more than some predetermined threshold percentage of households that are within the digitally exposed audience 222). The television advertising decision-making system may then schedule a television advertisement to be delivered during the television delivery of the identified television inventory, where the scheduled television advertisement:

is the same advertisement as the advertisement whose impressions 220 were previously delivered to the digitally exposed audience 222;

advertises the same brand, product, or service as the advertisement whose impressions 220 were previously delivered to the digitally exposed audience 222; or advertises a brand, product, or service of the company whose brand, product, or service was advertised by the advertisement whose impressions 220 were previously delivered to the digitally exposed audience.

In the manner described above, the system 200 makes advertising scheduling decisions using data 228 to understand which television inventory (e.g., programs) or specific times of day and days of week on a particular television network which has historically been viewed by an audience that is of high concentration of the digitally exposed audience 222, and schedule advertisements to be shown during the identified television inventory.

The television advertising decision-making system 200 uses the television advertising schedules 230 to deliver impressions 232 of one or more television advertisements represented by the television advertising schedules 230 to a television exposed audience 234 via television (FIG. 3, operation 314). Because the television advertising schedules 230 are generated with the intent to target the digitally exposed audience 222, the television exposed audience 234 is likely to include users in the digitally exposed audience 222. As a result, the impressions 232 are likely to include impressions of many or all of the same advertisements to which the digitally exposed audience 222 was exposed via the digital advertisement impressions 220.

The term "television advertisement," as used herein, refers to an advertisement delivered via television. A television advertisement is not a "digital advertisement," as that term is used herein. The term "delivering an advertisement via television" refers to the placement of an advertisement within a television program or on a specified television network at a certain date/time whereby the advertisement will be seen by an audience tuned into that program or television network/day of week/hour on their television.

As the explanation above makes clear, the system 200 of FIG. 2 may be used to generate television advertising schedules 230 which target television advertisements to households based on the frequency with which those households were exposed to digital advertisements. More specifically, the system 200 may select advertisements previously viewed by a household in digital media for targeting at that household via television, by leveraging the data 224 obtained about the exposure of that household to digital advertisements.

Figure 5:
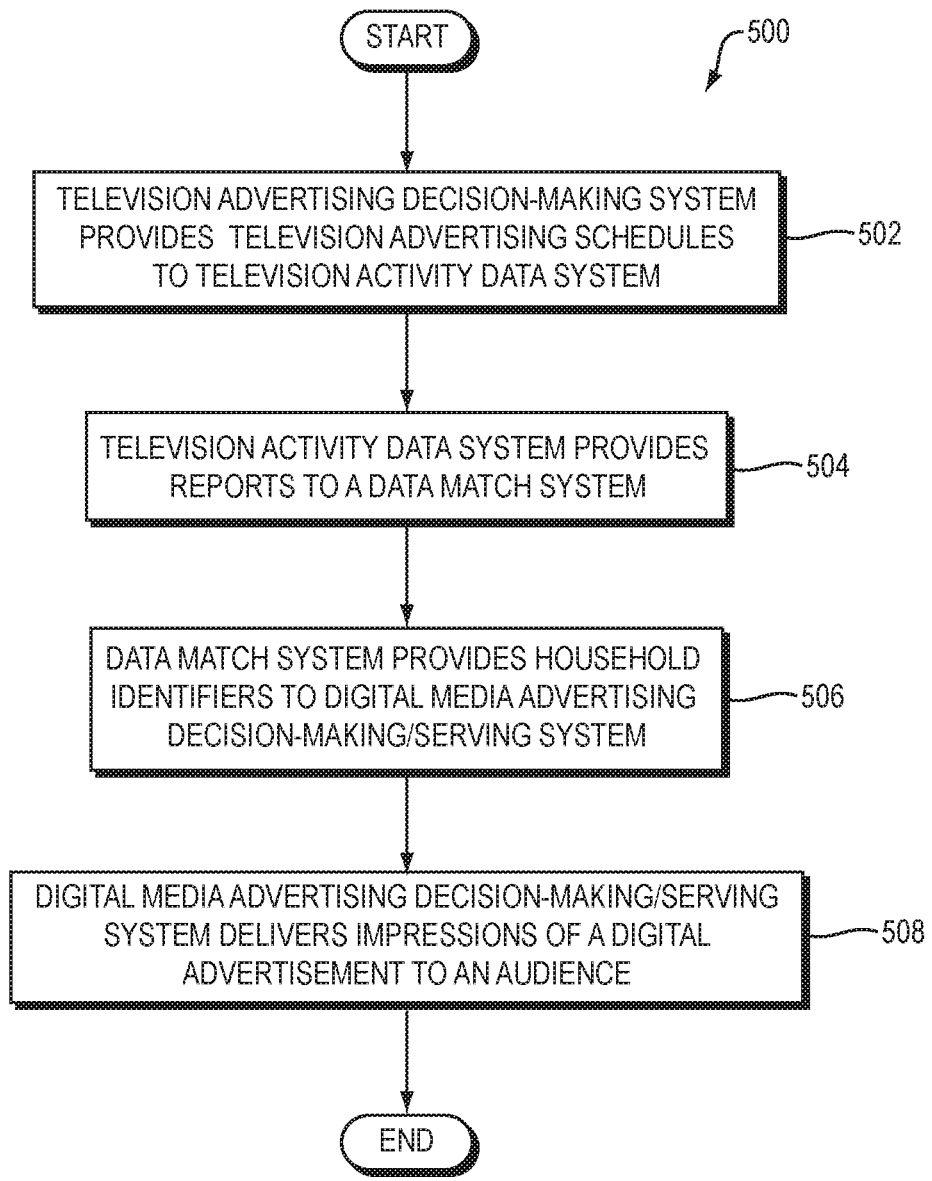
FIG. 5 is a flowchart of a method performed by one embodiment of the system of FIG. 4.

Conversely, embodiments of the present invention may also be used to generate digital advertising schedules which target digital advertisements to households based on the frequency with which those households were exposed to television advertisements. For example, referring to FIG. 4, a system 400 implemented according to one embodiment of the present invention is shown. The system 400 is one embodiment of the system 100 of FIG. 1. Referring to FIG. 5, a flowchart is shown of a method 500 performed by the system 400 of FIG. 4 according to one embodiment of the present invention.

The system 400 includes a television advertising decision-making system 402, which is an embodiment of the television advertising decision-making system 102 of FIG. 1. The television advertising decision-making system 402 generates one or more television advertising schedules 430. The television advertising decision-making system 402 may generate the television advertising schedules 430 in any of a variety of ways, such as by using conventional techniques. Each of the television advertising schedules 430 contains data representing a television advertisement to be delivered via television at a particular time, during a particular time period, or during a particular television program. The television advertising schedules 430 may, for example, have any of the properties described above in connection with the television advertising schedules 230 of FIG. 2, even though the television advertising schedules 430 of FIG. 4 may be generated using conventional techniques, wherein the television advertising schedules 230 of FIG. 2 may be generated using techniques of embodiments of the present invention. The system 402 may be computer-implemented (e.g., as a computing device and/or computer software), and may perform some or all of the functions disclosed herein automatically, i.e., without human intervention.

The television advertising decision-making system 402 provides the television advertising schedules 430 to a television activity data system 404, which is an embodiment of the television activity data system 104 of FIG. 1 (FIG. 5, operation 502). The television activity data system 404 of FIG. 4 may have any of the properties of the television activity data system 204 of FIG. 2. The television activity data system 404 may be computer-implemented (e.g., as a computing device and/or computer software), and may perform some or all of the functions disclosed herein automatically, i.e., without human intervention. The television advertising decision-making system 402 may provide the schedules 430 to the television activity data system 404 digitally over a digital communication network (such as the Internet) using an IP-based communication protocol. The television activity data system 404 receives the schedules 430 from the television advertising decision-making system 402.

The television activity data system 404 produces, based on the schedules 430 and viewership data (which may, for example, be obtained from set-top boxes), one or more reports 428 containing data representing measurements of the television exposed audience (i.e., the audience that was exposed, or is expected to have been exposed, to the inventory described by the television advertising schedules 430 previously provided). These reports 428 contain information about the audience (e.g., households), including when (timestamp) the exposure occurred, what content (e.g., the television network and/or program) was exposed, and who was exposed (e.g., the household that generated the set-top-box data).

The reports 428 may contain any of the properties and/or data contained in the reports 228 of FIG. 2. Reports 428 may, for example, contain measurements representing the number of times each of a plurality of households has watched each of a plurality of television programs. In other words, the reports 428 may indicate how frequently particular households watch particular television programs. The reports 428 may only represent households who were exposed to the programs represented by the schedules 430.

The television activity data system 404 may provide the reports 428 (which may include one or more handles representing the households in the television exposed audience) to a data match system 406, which is an embodiment of the data match system 106 of FIG. 1 (FIG. 5, operation 504). The data match system 406 may be computer-implemented (e.g., as a computing device and/or computer software), and may perform some or all of the functions disclosed herein automatically, i.e., without human intervention. The television activity data system 404 may provide the data 428 to the data match system 406 over a digital communication network (such as the Internet) using an IP-based communication protocol. The data match system 406 receives the data 428 from the television activity data system 404.

The data match system 406 may use any of a variety of techniques, including any of a variety of well-known techniques, to correlate the audience handles in the reports 428 with one or more households in the data match system 406, and thereby to produce digital audience identifiers 426 representing each of those households. More specifically, the data match system 406 may correlate the handles representing the television exposed audience in the reports 428 with identifiers of digital users through probabilistic or deterministic modeling. For example, the data match system 406 may correlate the handles with website cookies to identify the digital users who were exposed to the television ads displayed during the television schedules 430. The digital audience identifiers 426 may include data (e.g., person identifiers of any of the types disclosed herein) representing those digital users. As a result, the identifiers 426 include identifiers of digital users who were exposed to the television advertisements represented by the television schedules. Each of the identifiers 426, therefore, may identify an individual corresponding digital user.

The data match system 406 may then provide those household identifiers 426 to a digital media advertising decision-making/serving system 408, which is an embodiment of the digital media advertising decision-making/serving system 108 of FIG. 1 (FIG. 5, operation 506). The data match system 406 may provide the data 426 to the digital media advertising decision-making/serving system 408 digitally over a digital communication network (such as the Internet) using an IP-based communication protocol. The digital media advertising decision-making/serving system 408 may be computer-implemented (e.g., as a computing device and/or computer software), and may perform some or all of the functions disclosed herein automatically, i.e., without human intervention. The digital media advertising decision-making/serving system 408 receives the data 426 from the data match system 406.

The digital media advertising decision-making/serving system 408 delivers impressions 420 of a digital advertisement digitally to one or more users 422 (FIG. 5, operation 508). The digital media advertising system 408 may deliver the impressions 420 digitally over a digital communication network (such as the Internet) using an IP-based communication protocol. The digital media advertising system 408 selects the users 422, based on the data 426, to include the same, or at least some of the same, users as the television exposed audience (i.e., the audience who was exposed to the television programming represented by the television advertising schedules 430). More specifically, the digital media advertising system 408 may identify one or more advertisements that a particular user (or audience segment) was exposed to via television during the television schedules 430, and select, for delivery via a digital medium, to the same user (or audience segment):

the same advertisement that the user (or audience segment) was exposed to via television during the television schedules 430;

an advertisement that advertises the same brand, product, or service as the advertisement that the user (or audience segment) was exposed to via television during the television schedules 430; or an advertisement that advertises a brand, product, or service of the company whose brand, product, or service was advertised by the advertisement that the user was exposed to via television during the television schedules 430.

As the explanation above makes clear, the system 400 of FIG. 4 may be used to target digital advertisements to the same users who viewed (or who were expected to view) the same advertisements in the form of television advertisements. More specifically, the system 400 may select advertisements previously viewed by a household television for targeting at that household via digital media, by leveraging the data 426 obtained about the exposure of that household to digital advertisements.

Among the advantages of the invention are one or more of the following. Embodiments of the present invention enable an advertising campaign to be targeted across multiple media (e.g., television and digital media) based on exposure of the audience to the advertising campaign in each medium. In particular, embodiments of the present invention enable an audience that has been exposed to an advertising campaign in one medium (e.g., television or digital) to be targeted for exposure to the same advertising campaign in the other medium. This enables advertisers to increase the exposure of a particular audience to a particular ad campaign by exposing that audience to the ad campaign across more than one medium, and to do so intelligently and selectively based on knowledge of the kind and extent of the audience's exposure to the ad campaign in each medium.

Certain embodiments of the present invention may be used to expose viewers who have been exposed to particular advertisements via one medium (e.g., television) to the same or similar advertisements via a different medium (e.g., digital media). Conversely, certain embodiments of the present invention may be used to identify viewers who were not exposed to particular advertisements via one medium, and expose those viewers to the same or similar advertisements via a different medium. For example, any of the techniques disclosed herein may identify one or more households that were not exposed (or not likely exposed, or not likely to be exposed) to an advertisement via a first medium, and then target the advertisement at the identified household(s) via a second medium (such as by scheduling the advertisement to be delivered to the identified household(s) via the second medium and/or delivering the advertisement to the identified household(s) via the second medium). Such embodiments may be used advantageously to increase the overall number of households that are exposed to particular advertisements.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention obtain data (such as data 220, 224, 226, 228, 420, 426, 428, and 430) automatically from various sources in digital form using IP-based protocols over digital communication networks, and analyze that data automatically. No human or collection of humans could perform this function.

Embodiments of the present invention include improved computer systems. For example, a computer system that implements the system 200 of FIG. 2 is an improved computer that represents an improvement to computer technology because such a computer is capable of performing the functions of the system 200 automatically to achieve a result that previously could not be achieved by previous computer systems. The resulting computer system, therefore, has benefits disclosed herein, and therefore represents an improvement over previous computer systems which are lacking in such benefits.

Furthermore, embodiments of the present invention are inherently rooted in computer and network technology. For example, as disclosed herein, embodiments of the present invention enable digital advertisements to be automatically selected and delivered to digital media viewers (e.g., computer users) over a computer network (e.g., the Internet) in order to provide such viewers with advertisements that are the same as, or similar to, advertisements that those viewers previously were exposed to via television. In order to select and deliver such targeted digital advertisements (such as advertisements displayed on web pages and in mobile applications), it is necessary to gather information via computer over computer networks and then to deliver the selected advertisements to the viewers over a computer network (e.g., the Internet). Such techniques do not have any analog in the non-digital world. Furthermore, such dynamic and automatic selection and delivery of targeted advertisements to users can only be performed using computers and digital communication networks, and therefore is inherently rooted in computer and network technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
    (A) obtaining, over a digital communication network, data representing exposure of an audience to a digital advertisement via a digital medium, the audience including a plurality of users, the data representing exposure of the audience comprising at least one of: (1) a plurality of person identifiers, each of which identifies a corresponding individual person exposed to the digital advertisement; and (2) a plurality of household identifiers, each of which identifies a corresponding individual households exposed to the digital advertisement, wherein the digital advertisement advertises at least a first one of a product and a service of a particular advertiser;
    (B) automatically selecting a television advertisement which advertises at least one second one of a product and a service of the particular advertiser; and
    (C) generating, based on the data representing the exposure of the audience to the digital advertisement, data representing a schedule of the television advertisements to be broadcast to the audience via television, wherein the schedule includes the automatically selected television advertisement.

2. The method of claim 1, wherein the digital medium comprises the World Wide Web, and wherein the exposure of the audience to the digital advertisement via the digital medium comprises delivery of the digital advertisement to the audience via the World Wide Web.

3. The method of claim 1, wherein the digital medium comprises text messaging, and wherein the exposure of the audience to the digital advertisement via the digital medium comprises delivery of the digital advertisement to the audience via a plurality of text messages.

4. The method of claim 1, wherein the digital medium comprises email messaging, and wherein the exposure of the audience to the digital advertisement via the digital medium comprises delivery of the digital advertisement to the audience via an email message.

5. The method of claim 1, further comprising:
    (D) before (A), delivering, to the audience via the digital medium, the digital advertisement.

6. The method of claim 1, wherein obtaining the data representing the exposure of the audience to the digital advertisement via the digital medium comprises obtaining at least one HTTP cookie.

7. The method of claim 1, wherein obtaining the data representing the exposure of the audience to the digital advertisement via the digital medium comprises obtaining a mobile advertisement identifier.

8. The method of claim 1, wherein (A) comprises, at a data match system, receiving, over the digital communication network, from a digital media advertising system, a plurality of audience handles representing the audience.

9. The method of claim 8, wherein (C) comprises:
    (C)(1) producing, based on the plurality of audience handles, a report representing a number of times the audience has been exposed to the digital advertisement.

10. The method of claim 9, wherein (C) further comprises:
    (C)(2) providing the report to a television advertising decision-making system over the Internet.

11. The method of claim 9, wherein generating the data representing the schedule of television advertisements comprises generating the data representing the schedule of television advertisements based on the report.

12. The method of claim 11, wherein generating the data representing the schedule of television advertisements based on the report comprises:
    (i) identifying television inventory having a high concentration of the audience; and
    (ii) scheduling the digital advertisement to be provided during the identified television inventory.

13. A system comprising at least one non-transitory computer readable medium having computer program instructions stored thereon, the computer program instructions being executable by at least one computer processor to perform a method, the method comprising:

(A) obtaining, over a digital communication network, data representing exposure of an audience to a digital advertisement via a digital medium, the audience including a plurality of users, the data representing exposure of the audience comprising at least one of: (1) a plurality of person identifiers, each of which identifies a corresponding individual person exposed to the digital advertisement; and (2) a plurality of household identifiers, each of which identifies a corresponding individual households exposed to the digital advertisement, wherein the digital advertisement advertises at least a first one of a product and a service of a particular advertiser;

(B) automatically selecting a television advertisement which advertises at least one second one of a product and a service of the particular advertiser; and (C) generating, based on the data representing the exposure of the audience to the digital advertisement, data representing a schedule of the television advertisements to be broadcast to the audience via television, wherein the schedule includes the automatically selected television advertisement.

14. The system of claim 13, wherein the digital medium comprises the World Wide Web, and wherein the exposure of the audience to the digital advertisement via the digital medium comprises delivery of the digital advertisement to the audience via the World Wide Web.

15. The system of claim 13 wherein the digital medium comprises text messaging, and wherein the exposure of the audience to the digital advertisement via the digital medium comprises delivery of the digital advertisement to the audience via a plurality of text messages.

16. The system of claim 13, wherein the digital medium comprises email messaging, and wherein the exposure of the audience to the digital advertisement via the digital medium comprises delivery of the digital advertisement to the audience via an email message.

17. The system of claim 13, wherein the method further comprises:

(D) before (A), delivering, to the audience via the digital medium, the digital advertisement.

18. The system of claim 13, wherein obtaining the data representing the exposure of the audience to the digital advertisement via the digital medium comprises obtaining at least one HTTP cookie.

19. The system of claim 13, wherein obtaining the data representing the exposure of the audience to the digital advertisement via the digital medium comprises obtaining a mobile advertisement identifier.

20. The system of claim 13, wherein (A) comprises, at a data match system, receiving, over the digital communication network, from a digital media advertising system, a plurality of audience handles representing the audience.

21. The system of claim 20, wherein (C) comprises:

(C)(1) producing, based on the plurality of audience handles, a report representing a number of times the audience has been exposed to the digital advertisement.

22. The system of claim 21, wherein (C) further comprises:

(C)(2) providing the report to a television advertising decision-making system over the Internet.

23. The system of claim 21, wherein generating the data representing the schedule of television advertisements comprises generating the data representing the schedule of television advertisements based on the report.

24. The system of claim 23, wherein generating the data representing the schedule of television advertisements based on the report comprises:

(i) identifying television inventory having a high concentration of the audience; and (ii) scheduling the digital advertisement to be provided during the identified television inventory.

* * * * *